US007781512B2

(12) United States Patent
Charbonneau et al.

(10) Patent No.: US 7,781,512 B2
(45) Date of Patent: Aug. 24, 2010

(54) CONTROL OF PRODUCT IN CURING OVENS FOR FORMALDEHYDE-FREE GLASS FIBER PRODUCTS

(75) Inventors: Mark William Charbonneau, Littleton, CO (US); Derek C. Bristol, Littleton, CO (US); Harrison John Brown, Denver, CO (US); Charles John Freeman, Littleton, CO (US)

(73) Assignee: Johns Manville, Denver, CO (US)

( * ) Notice: Subject to any disclaimer, the term of this patent is extended or adjusted under 35 U.S.C. 154(b) by 275 days.

(21) Appl. No.: 10/888,823

(22) Filed: Jul. 9, 2004

(65) Prior Publication Data

US 2006/0009569 A1  Jan. 12, 2006

(51) Int. Cl.
*G01J 5/10* (2006.01)
*F26B 19/00* (2006.01)
*C03C 25/02* (2006.01)
*B32B 27/00* (2006.01)
*D04H 3/00* (2006.01)

(52) U.S. Cl. .................. 524/494; 524/556; 374/124; 374/126; 374/128; 374/153; 374/9; 34/48; 34/203; 65/162; 428/290; 442/327; 442/415; 442/417

(58) Field of Classification Search .............. 524/556, 524/494; 65/3.43, 4.4, 11.1, 29, 162; 428/290; 442/327, 415, 417; 374/124, 126
See application file for complete search history.

(56) References Cited

U.S. PATENT DOCUMENTS 3,824,387 A * 7/1974 Garst ...................... 700/74
4,076,917 A * 2/1978 Swift et al. ............... 525/329.5
4,276,480 A * 6/1981 Watson .................... 250/559.1
4,582,520 A * 4/1986 Sturm ........................ 65/382
4,683,165 A * 7/1987 Lindemann et al. ......... 442/173
4,867,574 A    9/1989 Jenkofsky
5,186,541 A * 2/1993 Paulk ........................ 374/124
5,209,881 A * 5/1993 Charbonnet ................ 264/493
5,276,978 A * 1/1994 Hopkins et al. .............. 34/550
2003/0008586 A1* 1/2003 Kajander et al. ............ 442/327
2004/0130072 A1   7/2004 Sekido et al.

FOREIGN PATENT DOCUMENTS

EP          0583086          2/1994

(Continued)

OTHER PUBLICATIONS

Canadian Office Action issued Mar. 26, 2009 during the prosecution of Canadian Patent Application No. 2,570,150.

(Continued)

*Primary Examiner*—Duane Smith
*Assistant Examiner*—Ives Wu
(74) *Attorney, Agent, or Firm*—Robert D. Touslee

(57) ABSTRACT

A system for curing a binders applied to glass fibers is disclosed. The curing of the binder is accomplished by passing the binder coated glass fibers through a curing oven having one or more temperature zones. The temperature of the binder coated glass fibers is monitored and the temperature in the curing oven is adjusted to ensure proper heating of the glass fibers thereby ensuring uniform curing of the binder composition. Temperature measurements are made either as the product traverses the oven or as the cured product exits the curing oven. The invention is particularly useful for curing acrylic thermoset binders and formaldehyde-free binders.

4 Claims, 2 Drawing Sheets

FOREIGN PATENT DOCUMENTS

| | | | |
|---|---|---|---|
| US | EP-990727 | A1 * | 4/2000 |
| US | EP-0990727 | A1 * | 4/2000 |
| US | EP-0990727 | A1 * | 5/2000 |

OTHER PUBLICATIONS

International Preliminary Report on Patentability issued Jan. 9, 2007 (Published Jan. 9, 2007) during the prosecution of International Application No. PCT/US05/24026.

International Search Report issued Jun. 29, 2006 (Published Nov. 16, 2006) during the prosecution of International Application No. PCT/US05/24026.

Written Opinion of the International Searching Authority issued Jun. 29, 2006 (Published Jan. 9, 2007) during the prosecution of International Application No. PCT/US05/24026.

* cited by examiner

CONTROL OF PRODUCT IN CURING OVENS FOR FORMALDEHYDE-FREE GLASS FIBER PRODUCTS

TECHNICAL FIELD

The invention relates to a method for controlling the product cure of glass fiber products having a formaldehyde-free bender system. The temperature of the glass fiber product is monitored either while the product is in the curing oven or just as it leaves the curing oven. If the product does not exhibit the temperature profile or exit temperatures, adjustments are made to the process to ensure proper curing.

BACKGROUND OF THE INVENTION

Fiberglass binders have a variety of uses ranging from stiffening applications where the binder is applied to woven or non-woven fiberglass sheet goods and cured, producing a stiffer product; thermo-forming applications wherein the binder resin is applied to sheet or lofty fibrous product following which it is dried and optionally B-staged to form an intermediate but yet curable product; and to fully cured systems such as building insulation.

Fibrous glass insulation products generally comprise matted glass fibers bonded together by a cured thermoset polymeric material. Molten streams of glass are drawn into fibers of random lengths and blown into a forming chamber where they are randomly deposited as a mat onto a traveling conveyor. The fibers, while in transit in the forming chamber and while still hot from the drawing operation, are sprayed with an aqueous binder. A phenol-formaldehyde binder is currently used throughout the fibrous glass insulation industry. The residual heat from the glass fibers and the flow of air through the fibrous mat during the forming operation are generally sufficient to volatilize the majority to all of the water from the binder, thereby leaving the remaining components of the binder on the fibers as a viscous or semi-viscous high solids liquid. The coated fibrous mat is transferred to a curing oven where heated air, for example, is blown through the mat to cure the binder and rigidly bond the glass fibers together.

Fiberglass binders used in the present sense should not be confused with matrix resins which are an entirely different and non-analogous field of art. While sometimes termed "binders", matrix resins act to fill the entire interstitial space between fibers, resulting in a dense, fiber reinforced product where the matrix must translate the fiber strength properties to the composite, whereas "binder resins" as used herein are not space-filling, but rather coat only the fibers, and particularly the junctions of fibers. Fiberglass binders also cannot be equated with paper or wood product "binders" where the adhesive properties are tailored to the chemical nature of the cellulosic substrates. Many such resins, e.g. urea/formaldehyde and resorcinol/formaldehyde resins, are not suitable for use as fiberglass binders. One skilled in the art of fiberglass binders would not look to cellulosic binders to solve any of the known problems associated with fiberglass binders.

Binders useful in fiberglass insulation products generally require a low viscosity in the uncured state, yet characteristics so as to form a rigid thermoset polymeric mat for the glass fibers when cured. A low binder viscosity in the uncured state is required to allow the mat to be sized correctly. Also, viscous binders tend to be tacky or sticky and hence they lead to accumulation of fiber on the forming chamber walls. This accumulated fiber may later fall onto the mat causing dense areas and product problems. A binder which forms a rigid matrix when cured is required so that a finished fiberglass thermal insulation product, when compressed for packaging and shipping, will recover to its specified vertical dimension when installed in a building.

From among the many thermosetting polymers, numerous candidates for suitable thermosetting fiber-glass binder resins exist. However, binder-coated fiberglass products are often of the commodity type, and thus cost becomes a driving factor, generally ruling out such resins as thermosetting polyurethanes, epoxies, and others. Due to their excellent cost/performance ratio, the resins of choice in the past have been phenol/formaldehyde resins. Phenol/formaldehyde resins can be economically produced, and can be extended with urea prior to use as a binder in many applications. Such urea-extended phenol/formaldehyde binders have been the mainstay of the fiberglass insulation industry for years.

Over the past several decades, however, minimization of volatile organic compound emissions (VOCs) both on the part of the industry desiring to provide a cleaner environment, as well as by Federal regulation, has led to extensive investigations into not only reducing emissions from the current formaldehyde-based binders, but also into candidate replacement binders. For example, subtle changes in the ratios of phenol to formaldehyde in the preparation of the basic phenol/formaldehyde resole resins, changes in catalysts, and addition of different and multiple formaldehyde scavengers, has resulted in considerable improvement in emissions from phenol/formaldehyde binders as compared with the binders previously used. However, with increasing stringent Federal regulations, more and more attention has been paid to alternative binder systems which are free from formaldehyde.

One particularly useful formaldehyde-free binder system employs a binder comprising a polycarboxy polymer and a polyol. Formaldehyde-free resins are those which are not made with formaldehyde or formaldehyde-generating compounds. Formaldehyde-free resins do not emit appreciable levels of formaldehyde during the insulation manufacturing process and do not emit formaldehyde under normal service conditions. Use of this binder system in conjunction with a catalyst, such as an alkaline metal salt of a phosphorous-containing organic acid, results in glass fiber products that exhibit excellent recovery and rigidity properties.

These novel binder systems, however, are best employed at a pH of less than about 3.5, preferably less than 2.5, more preferably less than about 2.0. Variations in pH of as little as 0.3 can result in poor curing of the binder composition. This, in turn, results in glass fiber products which exhibit poor performance upon curing.

Curing of the fiberglass products is essential to proper product performance. In addition to the pH of the binder system, the temperature at which the product is cured and the time the product remains at that temperature is important. The product must be thoroughly heated for a sufficiently long time to ensure that full curing takes place.

It is desirable to employ a system whereby the product can be continuously monitored to determine if the product has been thoroughly heated to a temperature sufficient to ensure proper curing. It is also desirable to provide a feedback system whereby the conditions in the curing oven can be adjusted to provide sufficient heating to thoroughly cure the product.

BRIEF SUMMARY OF THE INVENTION

Glass fiber products such as fiberglass insulation are formed by spinning glass fibers and then coating the fibers with a binder composition. The coater fibers are gathered into a bat or mass of glass fibers. The binder coated fibers are then subjected to a curing step wherein the binder composition cross-links. This helps hold the fibers together and provides improved mechanical properties.

Curing is commonly accomplished by heating the binder coated fibers in a curing oven. The ovens are usually multi zone ovens with different temperature profiles in different zones. To ensure adequate curing, the coated fibers must be thoroughly heated to a prescribed temperature and maintained at that temperature for a minimum length of time. This time and temperature required to secure a proper cure is such factor as dependent on the nature of the binder used, the thickness of the glass fiber product, and the like.

Typically, for formaldehyde free binders, the desired temperature will generally range from 160° to 240° C. for periods ranging from 0.5 to 5 minutes. Again, the time and temperatures will be dependent, in part, on the nature of the binder system. For example, poly acrylic acid binders such as those described in EP0583086A1 requires a temperature of from 180° C. to 240° C. with the time of any being dependent on the temperature. Other systems call for curing product temperatures of 150° to 200° C. and times ranging from 0.5 to 15 minutes.

To ensure that the glass fiber products have been thoroughly heated, sensors are employed to measure the surface heat of the product as it leaves the oven. If the surface temperature is at least about 210° C., the product cure has been found to be adequate. If the temperature is less than that temperature, complete curing has not occurred and product quality will be poor.

Alternatively, heat measurements may be taken while the glass fiber product traverses the oven. This can be accomplished by attaching thermocouplers directly to the product and monitoring the changes in product temperatures and ambient temperatures as the product moves through the oven. Data collected in the thermocouplers is either relayed to a recorder external to the oven or to a recorder that moves with the product as it traverses the oven.

When the product temperature fails to reach 150° C., adjustments are made to the oven conditions to raise the final product temperature. These include raising the temperature in one or more oven zones, increasing the flow of hot air through the product and adjusting the speed at which the product moves through the oven. Any of these variables either alone or in combination can cause changes in the final product temperatures.

In the method of the invention, the temperature of the final product is measured as the product emerges from the curing oven. The measured temperature is then compared with a pre-set temperature value. If the measured value is less than the pre-set value adjustments are made to one or more oven variables to increase the final product temperature such that it is greater than or equal to the pre-set value.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
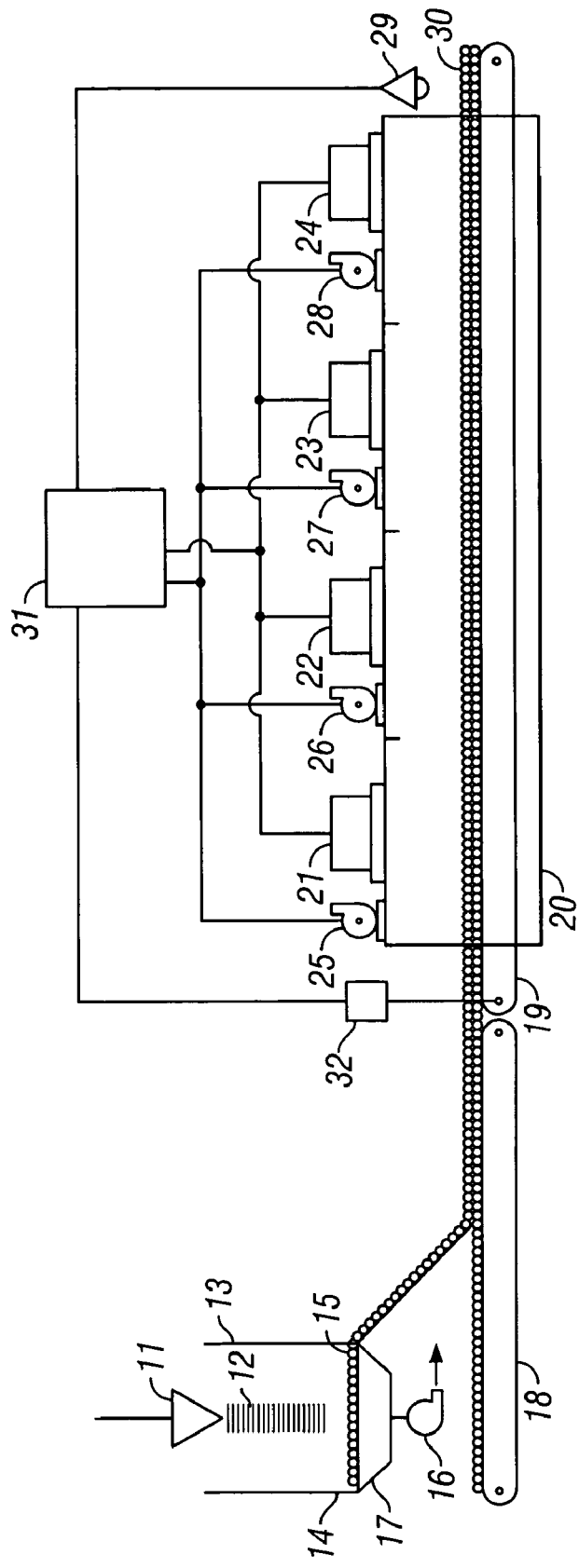
FIG. 1 is a schematic of the control system of the invention using an exit sensor.

Structural integrity and physical properties of glass fiber products are directly related to the use of binders which hold the glass fibers together and provide stiffness and resiliency to the products. The effectiveness of the binder composition is due in large measure to how well the binder is cured. This is particularly true for novel formaldehyde-free binder compositions that are currently being used by fiberglass manufacturers. The curing of binder compositions is dependant upon, in part, the temperature of the binder resin and the length of time that the temperature is maintained. The present invention provides a means for determining if the resin coated product has been sufficiently heated to ensure that the resin is properly cured. The invention also provides a feed back system for adjusting the conditions in the curing oven if the product has not been properly cured to ensure proper curing of the remaining product.

The present invention is particularly useful for ensuring proper curing of acrylic thermoset binders, including, but not limited to, formaldehyde-free binders. The formaldehyde-free binders useful in the practice of this invention are typically prepared from resins comprising poly-carboxy polymers such as acrylic resins although other formaldehyde-free resins may be employed. As used herein, the term "formaldehyde-free" means that the resin or binder composition is substantially free of formaldehyde and/or does not liberate formaldehyde as a result of curing or drying. They generally have a molecular weight of less than about 10,000, preferably less than about 5,000, most preferably less than about 3,000 with about 2,000 being advantageous.

The polycarboxy polymer used in the formaldehyde-free binder comprises an organic polymer or oligomer containing more than one pendant carboxy group. The polycarboxy polymer may be a homopolymer or copolymer prepared from unsaturated carboxylic acids including but not necessarily limited to, acrylic acid, methacrylic acid, crotonic acid, isocrotonic acid, maleic acid, cinnamic acid, 2-methylmaleic acid, itaconic acid, 2-methylitaeonic acid, .alpha.,.beta.-methyleneglutaric acid, and the like. Alternative, the polycarboxy polymer may be prepared from unsaturated anhydrides including, but not necessarily limited to, maleic anhydride, methacrylic anhydride, and the like, as well as mixtures thereof. Methods for polymerizing these acids and anhydrides are well-known in the chemical art.

The formaldehyde-free curable aqueous binder composition also contains a polyol containing at least two hydroxyl groups. The polyol must be sufficiently nonvolatile such that it will substantially remain available for reaction with the polyacid in the composition during heating and curing operations. The polyol may be a compound with a molecular weight less than about 1000 bearing at least two hydroxyl groups such as, for example, ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols such as, for example, .beta.-hydroxyalkylamides such as, for example, bis[N,N-di(β-hydroxyethyl)]adipamide, as may be prepared according to the teachings of U.S. Pat. No. 4,076,917, hereby incorporated herein by reference, or it may be an addition polymer containing at least two hydroxyl groups such as, for example, polyvinyl alcohol, partially hydrolyzed polyvinyl acetate, and homopolymers or copolymers of hydroxyethyl (meth) acrylate, hydroxypropyl (meth) acrylate, and the like. The most preferred polyol for the purposes of the present invention is triethanolamine (TEA).

The ratio of the number of equivalents of carboxy, anhydride, or salts thereof of the polyacid to the number of equivalents of hydroxyl in the polyol is from about 1/0.01 to about 1/3. An excess of equivalents of carboxy, anhydride, or salts thereof of the polyacid to the equivalents of hydroxyl in the polyol is preferred. The more preferred ratio of the number of equivalents of carboxy, anhydride, or salts thereof in the polyacid to the number of equivalents of hydroxyl in the polyol is from about 1/0.4 to about 1/1. The most preferred ratio of the number of equivalents of carboxy, anhydride, or salts thereof in the polyacid to the number of equivalents of hydroxyl in the polyol is from about 1/0.6 to about 1/0.8, and most preferably from 1/0.65 to 1/0.75. A low ratio, approaching 0.7:1, has been found to be of particular advantage in the present invention, when combined with a low molecular weight polycarboxy polymer and the low pH binder.

The formaldehyde-free curable aqueous binder composition also contains a catalyst. Most preferably, the catalyst is a phosphorous-containing accelerator which may be a compound with a molecular weight less than about 1000 such as, for example, an alkali metal polyphosphate, an alkali metal dihydrogen phosphate, a polyphosphoric acid, and an alkyl phosphinic acid or it may be an oligomer or polymer bearing phosphorous-containing groups such as, for example, addition polymers of acrylic and/or maleic acids formed in the presence of sodium hypophosphite, addition polymers prepared from ethylenically unsaturated monomers in the presence of phosphorous salt chain transfer agents or terminators, and addition polymers containing acid-functional monomer residues such as, for example, copolymerized phosphoethyl methacrylate, and like phosphonic acid esters, and copolymerized vinyl sulfonic acid monomers, and their salts. The phosphorous-containing accelerator may be used at a level of from about 1% to about 40%, by weight based on the combined weight of the polyacid and the polyol. Preferred is a level of phosphorous-containing accelerator of from about 2.5% to about 10%, by weight based on the combined weight of the polyacid and the polyol.

The binder reserves used in the invention are usually supplied as an aqueous suspension containing about 48 to 53 wt % solids. The binder composition used in the invention is prepared by first further diluting the binder to a point where the composition contains from about 1 to about 10 percent solids.

Acid is then added to the aqueous binder composition to reduce the pH to a less than about 3.5, preferably less than 3.0, much preferably less than 2.5. Low pH has been found to be important in ensuring proper application and curing of the binder composition.

Curing of the binders is most often accomplished by heating the binder coated fibers in a curing oven. Curing ovens typically are arranged with one or more temperature zones. In each zone, the binder-coated fibers are subjected to a temperature in the range of 150° C. to 325° C. with from 180 to 250° C. preferred. The time the product is in the product oven ranges from about 5 to about 3 minutes with from 1 to 2.5 minutes preferred. Air is also forced through the fiberglass product by fans associated with each zone to ensure uniform heating of the fiberglass product.

Referring to FIG. 1, the fiberglass products are prepared by introducing molten glass through a spinner 10 to form glass fibers 12. The fibers leave the spinner, they are coated with an aqueous binder composition compressing the binders described above. The fibers are then gathered in a collection box 13 where they are collected on a forming conveyor 14 forming a mat 15 of uncured coated fibers. Air is pulled through the collection box 17 by a fan 16 to ensure aiding in the formation of the mat. A dropout box 17 is used to reduce the velocity of air between the conveyor 14 and the fan 16.

The fans 24, 25, 26 and 27 associated with each zone are used to draw hot air through the fiberglass mat. The forming conveyor 14 brings the mat 15 out of the collection box and then to a second conveyor 17. It is then transferred to a mesh oven conveyor 18 for movement through the curing oven 20. The curing oven 20 in FIG. 1 is a four-zone oven, however, any arrangement of zones can be used to curing the product to ensure proper curing.

Each zone of the oven has an associated heating unit 21, 22, 23, 24 and a fan 25, 26, 27, 28, which are each capable of being individually controlled. The fans 25, 26, 27, and 28 associated with each zone are used to draw hot air through the fiber mat 15 to provide thorough heating of the mat 5 thereby ensuring complete curing.

The uncured fiberglass mat 15 is moved through the oven 20 by means of a conveyor 9 which transports the fiberglass mat 15 through the oven 20 at a constant speed associated with each zone. Through a combination of oven temperature, air flow and residence time in the oven, the glass fiber product should reach a sufficient temperature for a long enough period that the binder composition completely cures.

The temperature profiles in a curing oven, however, are not always uniform and the product may not reach the desired temperature for the required time. In one embodiment, the present invention provides a system for monitoring product temperature just after the curing oven and, based on the temperature measured, adjusting one or more variables in the oven to ensure that the product renders the desired temperatures.

Referring again to FIG. 1, a temperature sensor 29 is positioned at the exit of the curing oven 20 such that it can monitor the product 30 temperature as the cured product leaves the oven 20. The temperature sensor 29 relays the measured temperature to a control unit 31 where the measured temperature is compared with a preset temperature. If the temperature deviates from the preset temperature by more than a prescribed variation, the control unit causes changes in one or more upstream variables which can cause changes in the product.

In this embodiment, indirect sensors, such as spectrographic sensors are typically used, with infrared sensors are preferred. Indirect sensors are preferred as they do not interfere with process flow.

The selection of an infra-red sensor is dependent upon such factors as the temperature rays required, size, nature of the material to be evaluated. Infra-red sensors detect the infra-red energy emitted by the product as it exits the oven. The hotter the product, the greater the infra-red energy. The radiant infra-red energy is then collected through optics and focused onto a detector. The detector then converts the energy into an electrical signal, which is then amplified and displayed. The signal can also be relayed to a data processing device.

In practice of the invention, the infra-red sensors should be capable of detecting temperatures as low as about 38° C. and as high as 232.2° C. The accuracy of the sensor should be within ±2%.

While one sensor may be sufficient to obtain an adequate measurement in the preferred embodiment, two or more sensors are employed. In this manner a more complete measurement of the product temperature can be made.

The pre-set temperature profile or final product temperature that is used for comparison will depend, in large part, on the nature of the binder composition, the pre-curing moisture of the product and the like. Generally, for formaldehyde-free, acrylic based binders, the final product should be from 182 to 260° C.

When the measurements are made by one of the methods discussed above, the data is then relayed to a control unit 21 where the measured temperature is compared with a prescribed or pre-set temperature or temperature profile. Where the measured data differs from the pre-set values by more than a prescribed variance, adjustments are then made to the curing process to bring the measured values in line with the pre-set values. Typically, the variance that is permitted ranges from 5 to 25° C. with a variance of no more than ±5° C. preferred. Among the variables which may be adjusted are the airflow through the product, the temperatures within the curing oven and the rate at which the product moves through the oven as well as the moisture of the product as it enters the oven. With respect to the airflow and temperature, adjustments can be made for one or more zones within the oven.

When working with formaldehyde-free binder systems, it is preferable that the curing oven 10 have at least two zones with four zones more preferable. Thus, in practicing of the invention, if the final product temperature is too low, then the heat in at least one of the zones can be increased. For example, referring again to FIG. 1, if the control unit 31 determines that the finished product temperature is less than the preset value, the control unit 31 transmits a signal to one or more of the heating units 21, 22, 23, and 24 thereby causing an increase in the temperature of the respective zone. Again referring to FIG. 1, the control unit 30 can cause a change in 1, 2, 3 or all 4 zones.

Control of the oven connections can be accomplished by any system that allows for the comparison of a measured temperature with a pre-set value and then, based on the difference between the values, causes a change in the oven conditions upstream of the temperature sensor. The system can be manual, automatic or semi-automatic with an automatic system preferred. One such system is a PID unit made by Rockwell Automation.

An alternative means for raising the temperature in one or more zones is the change in the rate at which air flows through the product. In this embodiment, the control unit sends a signal to one or more of the zone fans 25, 26, 27, and 28 causing an increase in the speed of the fans associated with each zone thereby increasing air flow. By increasing the flow of air through the zone and product, a more even heating of the product is achieved.

Yet another means for changing the final temperature of the product is by adjusting the speed at which the product passes through the oven. Generally, increase residence time in the oven will result in a hotter product and a better cure. Again, this is accomplished by the control unit sending a signal to the motor 32 which drives the conveyor. By adjusting the speed of the conveyor, product residence time can be increased or decreased.

Figure 2:
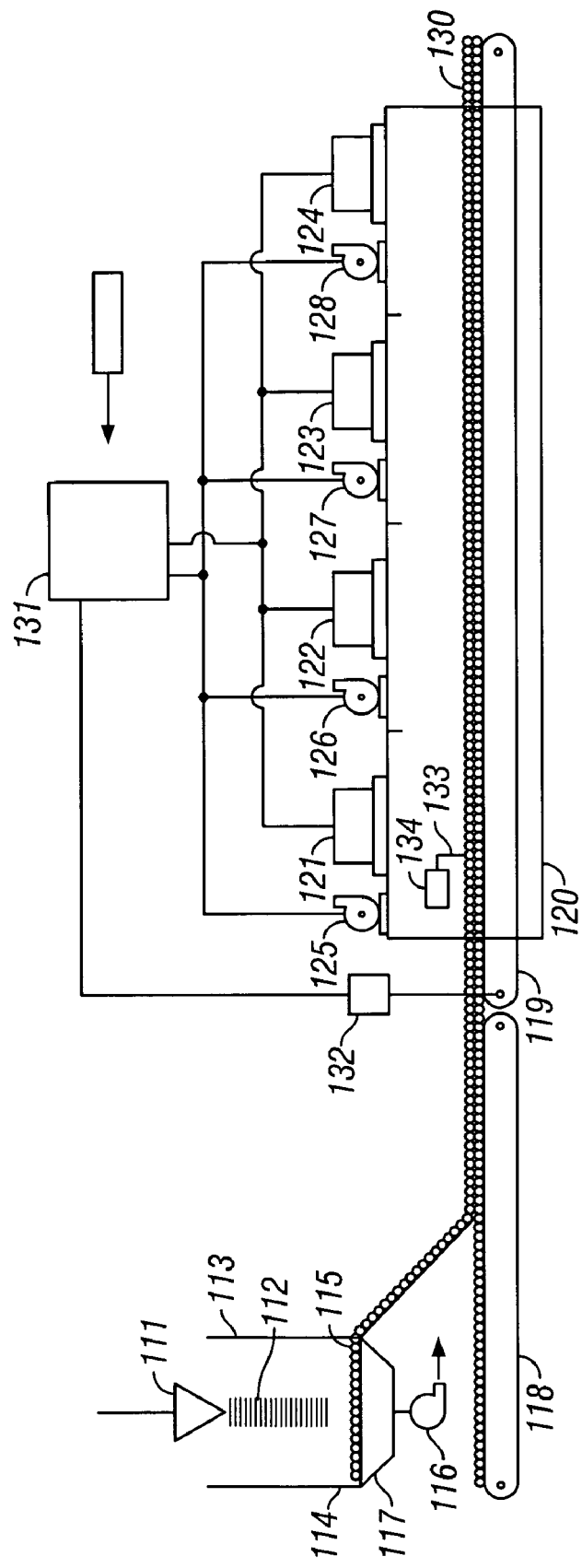
FIG. 2 is a schematic of the control system using a temperature monitor that accompanies the product.

FIG. 2 shows a different embodiment of the invention. In this embodiment, a temperature thermo-coupler 133 is placed in contact with the product 115. A recording device 134 is associated with the sensor and records the product and ambient temperature as the product passes through the oven temperature of the product as it proceeds through the oven. One such monitor is the M.O.L.E.® profiler manufactured by ECD, Inc. This result in a temperature profile showing how the temperature of the product changes over time and how long the product remained at a given temperature. When the data recorder exits the oven, the data is then extracted and compared with a pre-set product profile by the control unit 131. Typically, this would include a check to see if the product reached a temperature of at least 180° C. for at least 20 seconds. The remaining elements shown in FIG. 2 are the same as defined in FIG. 1 with the exception that they have been numbered with the prefix "100."

As described above, when the measured profile deviates from the pre-set profile, adjustments are then made to one or more variables in the oven until the measured profile matches the pre-set profile with an acceptable variance. As discussed above, this adjustment includes increasing the heat in one or more zones.

Another method for monitoring the temperature of the product is by attaching thermocouples to the product. The thermocouples are then attached to a wire which transmits the data from the couplers to a monitoring device outside the oven. The wire is of sufficient length to allow the thermocouples to pass completely through the oven with the product.

The advantage of these systems is that they give a direct measurement of the temperature of the product at various stages in the process. This allows a more accurate reading of the actual temperatures seen by the product and how long it was at that temperature.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for curing a formaldehyde-free binder composition comprising:

coating glass fibers with a formaldehyde-free binder composition;

heating the glass fibers in a multizone curing oven at a temperature of from about 180° C. to about 325° C. for a period of about 3 to about 5 minutes;

measuring the temperature of the glass fibers as the product traverses the oven by means of a sensor in contact with said glass fibers, the sensor traversing the oven with the glass fibers;

recording the temperature of the product as it traverses the oven to create a temperature profile;

comparing the measured temperature profile with a pre-set temperature profile;

adjusting one or more process conditions when the measured temperature profile varies from the pre-set temperature profile.

2. The method of claim 1 wherein the process condition is the temperature of one or more zones of the oven.

3. The method of claim 1 wherein the process condition is the air flow through one or more zones of the oven.

4. The method of claim 1 where the process condition is the residence time of the product in the oven.

* * * * *